(12) United States Patent
Mori et al.

(10) Patent No.: US 9,139,438 B2
(45) Date of Patent: Sep. 22, 2015

(54) GRAPHITIZATION FURNACE AND METHOD FOR PRODUCING GRAPHITE

(75) Inventors: Kazumi Mori, Kakamigahara (JP); Yoshiyasu Matsuda, Kakamigahara (JP)

(73) Assignees: IHI CORPORATION (JP); IHI MACHINERY AND FURNACE CO., LTD. (JP)

( * ) Notice: Subject to any disclaimer, the term of this patent is extended or adjusted under 35 U.S.C. 154(b) by 47 days.

(21) Appl. No.: 14/122,115

(22) PCT Filed: May 29, 2012

(86) PCT No.: PCT/JP2012/063734
§ 371 (c)(1),
(2), (4) Date: Nov. 25, 2013

(87) PCT Pub. No.: WO2012/165421
PCT Pub. Date: Dec. 6, 2012

(65) Prior Publication Data
US 2014/0127124 A1    May 8, 2014

(30) Foreign Application Priority Data
May 31, 2011    (JP) .................................. 2011-121226

(51) Int. Cl.
*C01B 31/04* (2006.01)
*F27B 9/06* (2006.01)
*F27B 9/20* (2006.01)
(Continued)

(52) U.S. Cl.
CPC .................. *C01B 31/04* (2013.01); *F27B 9/062* (2013.01); *F27B 9/20* (2013.01); *F27B 9/2469* (2013.01); *F27B 9/26* (2013.01); *F27B 9/36* (2013.01); *F27B 14/14* (2013.01)

(58) Field of Classification Search
CPC ........................................ C01B 31/04–31/0492
See application file for complete search history.

(56) References Cited

U.S. PATENT DOCUMENTS 6,783,747 B1    8/2004   Sudo ............................. 423/448
2013/0142212 A1   6/2013   Matsuda et al. .................. 373/6

FOREIGN PATENT DOCUMENTS

CN             2668601 Y       1/2005
GB             2185559 A       7/1987
(Continued)

OTHER PUBLICATIONS

International Search Report and Written Opinion mailed Aug. 28, 2012 in corresponding PCT International Application No. PCT/JP2012/063734.

(Continued)

*Primary Examiner* — Colleen Dunn
(74) *Attorney, Agent, or Firm* — Ostrolenk Faber LLP (57) ABSTRACT

A graphitization furnace (100) includes: split electrodes (122) that are conductive and are provided so as to be freely movable; crucibles (120) that are conductive and that contain carbon powder, with a bottom end portion (122*a*) of each split electrode (122) being buried in the carbon powder; upper electrodes (190) that are positioned so as to face a split electrode (122); lower electrodes (192) that are positioned so as to face a crucible (120); and a power supply unit (132) that, when a bottom end portion (190*a*) of an upper electrode (190) is placed in contact with a top end portion (122*b*) of a split electrode (122) and a top end portion (192*a*) of a lower electrode (192) is placed in contact with a base portion (120*b*) of a crucible (120), applies a voltage between the upper electrode (190) and the lower electrode (192).

9 Claims, 10 Drawing Sheets

(51) Int. Cl.
*F27B 9/24* (2006.01)
*F27B 9/26* (2006.01)
*F27B 9/36* (2006.01)
*F27B 14/14* (2006.01)

(56) References Cited

FOREIGN PATENT DOCUMENTS

| JP | 10-338512 | 12/1998 |
| JP | 2001-139374 | 5/2001 |
| JP | 2001-261323 | 9/2001 |
| JP | 2002-130956 | 5/2002 |
| JP | 2005-147419 | 6/2005 |
| JP | 2005-291515 | 10/2005 |
| JP | 2010-189766 | 9/2010 |
| SU | 456569 A1 | 3/1976 |
| WO | WO 98/46954 | 10/1998 |

OTHER PUBLICATIONS

Chinese Office Action, dated Jan. 12, 2015, issued in corresponding Chinese Patent Application No. 201280025906.8. English translation included. Total 11 pages.

European Search Report, dated Feb. 2, 2015, issued in corresponding European Patent Application No. 12792219.3. Total 6 pages.

Office Action dated Feb. 25, 2015 issued in corresponding Korean Patent Application No. 10-2013-7028453 with English translation.

Taiwanese Office Action dated Apr. 11, 2014, issued in corresponding Taiwanese Patent Application No. 101118919. Including English translation. Total 7 pages.

Decision on Grant dated Jun. 2, 2015 in corresponding Russian Patent Application No. 2013157202 (with English language translation)(13 pages).

GRAPHITIZATION FURNACE AND METHOD FOR PRODUCING GRAPHITE

CROSS-REFERENCE TO RELATED APPLICATIONS

The present application is a 35 U.S.C. §§371 national phase conversion of PCT/JP2012/063734, filed May 29, 2012, which claims priority to Japanese Patent Application No. 2011-121226, filed May 31, 2011, the contents of which are incorporated herein by reference. The PCT International Application was published in the Japanese language.

TECHNICAL FIELD

The present invention relates to a graphitization furnace that graphitizes carbon powder by heating it, and to a method for producing graphite.

TECHNICAL BACKGROUND

Graphite has excellent industrial properties such as its lubricating ability, its conductivity, its heat resistance, and its chemical resistance, and it is used in a wide range of fields such as the fields of semiconductors, nuclear energy, aviation, and machinery. Graphite is produced by, for example, heating carbon powder to a high temperature (for example, 2000 to 3000° C.) in a graphitization furnace.

Technology for this type of graphitization furnace has been disclosed in which a carbon powder injection port is provided in a top portion of the graphitization furnace, a graphite powder recovery port is provided in a bottom portion of the graphitization furnace, and a plurality of sets of electrodes are provided on either side in a horizontal direction and facing an area between the injection port and the recovery port through which the carbon powder passes. Each set of electrodes is then energized in sequence at mutually offset timings (see, for example, Patent document 1). In addition, technology has also been disclosed in which a case containing carbon powder is inserted between an upper electrode and a lower electrode, and the carbon powder is heated by energization (see, for example, Patent document 2).

DOCUMENTS OF THE PRIOR ART

Patent Documents

[Patent document 1] Japanese Unexamined Patent Application, First Publication No. H10-338512
[Patent document 2] Japanese Unexamined Patent Application, First Publication No. 2005-291515

DISCLOSURE OF THE INVENTION

Problems to be Solved by the Invention

As is mentioned above, in order to produce graphite, it is necessary to heat carbon powder to a high temperature such as, for example, 2000 to 3000° C. in a graphitization furnace. For example, in the technology disclosed in the aforementioned Patent document 1, a plurality of sets of electrodes are positioned facing each other, and graphitization is accomplished by concentrating the heating in those areas through which the graphite powder passes. However, there is a possibility that carbon powder that passes through areas that are not located between the electrodes will not be heated sufficiently and may not become graphitized. Furthermore, there is also a possibility that, after prolonged operations, graphite powder and the like will become adhered to the interior of the furnace so as to cause a bridge to be formed.

Moreover, when carbon powder is graphitized using the technology described in Patent document 2, because a conductive heating element is used for the case, the electrical resistance of the case is lower than that of the carbon powder so that it is difficult for an electrical current to flow into the carbon powder. Because of this, rather than by direct heating using Joule heat, the temperature of the carbon powder is instead raised by indirect heating via the case that is mainly heated by energization. As a consequence, it is not possible for the heating of the carbon powder to be performed efficiently.

The present invention was conceived in view of the above-described problems and it is an object thereof to provide a graphitization furnace and a graphite producing method that make it possible to efficiently graphitize carbon powder.

Means for Solving the Problem

In order to solve the above-described problems, a first aspect of the graphitization furnace of the present invention is provided with: split electrodes that are conductive and are provided so as to be freely movable; crucibles that are conductive and that contain carbon powder, with a bottom end portion of each split electrode being buried in the carbon powder and with a top end portion of the split electrodes protruding from the carbon powder; upper electrodes that are positioned such that a bottom end portion thereof faces the top end portion of a split electrode; lower electrodes that are positioned such that a top end portion thereof faces a base portion of a crucible; and a power supply unit that, when the bottom end portion of an upper electrode is placed in contact with the top end portion of a split electrode and the top end portion of a lower electrode is placed in contact with the base portion of a crucible, applies a voltage between the upper electrode and the lower electrode.

A second aspect of the present invention is the graphitization furnace according to the first aspect, wherein the bottom end portion of an upper electrode and the top end portion of a split electrode are in surface contact with each other, and surface areas of the surfaces that are in contact with each other are mutually different.

A third aspect of the present invention is the graphitization furnace according to the second aspect, wherein the surface area of the surface of the bottom end portion of an upper electrode is larger than the surface area of the surface of the top end portion of a split electrode.

A fourth aspect of the present invention is the graphitization furnace according to any one of the first through third aspects, wherein the surface of the bottom end portion of an upper electrode and the surface of the top end portion of a split electrode are formed as a pair of spherical surfaces having the same radius, with one spherical surface being a concave spherical surface and the other spherical surface being a convex spherical surface.

A fifth aspect of the present invention is the graphitization furnace according to any one of the first through fourth aspects, wherein there are further provided: an energization heating area where there are provided a plurality of energizing mechanisms that are formed by combining together an upper electrode and a lower electrode; and a transporting mechanism that sequentially transports the crucibles between the plurality of energizing mechanisms within the energization heating area, and wherein the power supply unit applies the voltage when the crucibles are positioned at each one of the plurality of energizing mechanisms.

A sixth aspect of the present invention is the graphitization furnace according to the fifth aspect, wherein side surface insulating material that limits any heat release from side surfaces of the crucibles is further provided at positions that are parallel to the direction in which the crucibles are transported by the transporting mechanism.

A seventh aspect of the present invention is the graphitization furnace according to the sixth aspect, wherein top surface insulating material that limits any heat release from a top surface of the crucibles is further provided at a position that is parallel to the direction in which the crucibles are transported by the transporting mechanism.

A third aspect of the present invention is the graphitization furnace according to any one of the first through fourth aspects, wherein the graphitization furnace is a batch furnace that performs batch processing from the receipt of the carbon powder through to the graphitization thereof with the horizontal position of the crucibles being fixed in place.

In order to solve the above-described problems, a first aspect of the graphite producing method of the present invention includes: a step in which carbon powder is placed in a crucible with a bottom end portion of a split electrode being buried in the carbon powder, and with a top end portion of the split electrode protruding from the carbon powder; a step in which a bottom end portion of an upper electrode is brought into contact with the top end portion of the split electrode, and a top end portion of a lower electrode is brought into contact with a base portion of the crucible; and a step in which voltage is applied between the upper electrode and the lower electrode so as to graphitize the carbon powder and thereby produce graphite.

Effects of the Invention

The present invention makes it possible to graphitize carbon powder efficiently.

BEST EMBODIMENTS FOR IMPLEMENTING THE INVENTION

Preferred embodiments of the present invention will now be described in detail with reference made to the drawings. The dimensions, materials, and other specific numerical values and the like portrayed in the present embodiment are merely examples that are intended to make the invention easier to understand and are not to be considered as limiting of the present invention. Note that in the present specification and drawings, elements having essentially the same functions and structure are allocated the same descriptive symbols so that any duplicated description thereof is omitted. Moreover, any elements not directly related to the present invention have been omitted from the drawings.
(First Embodiment: Continuous Furnace 100)

Figure 1:
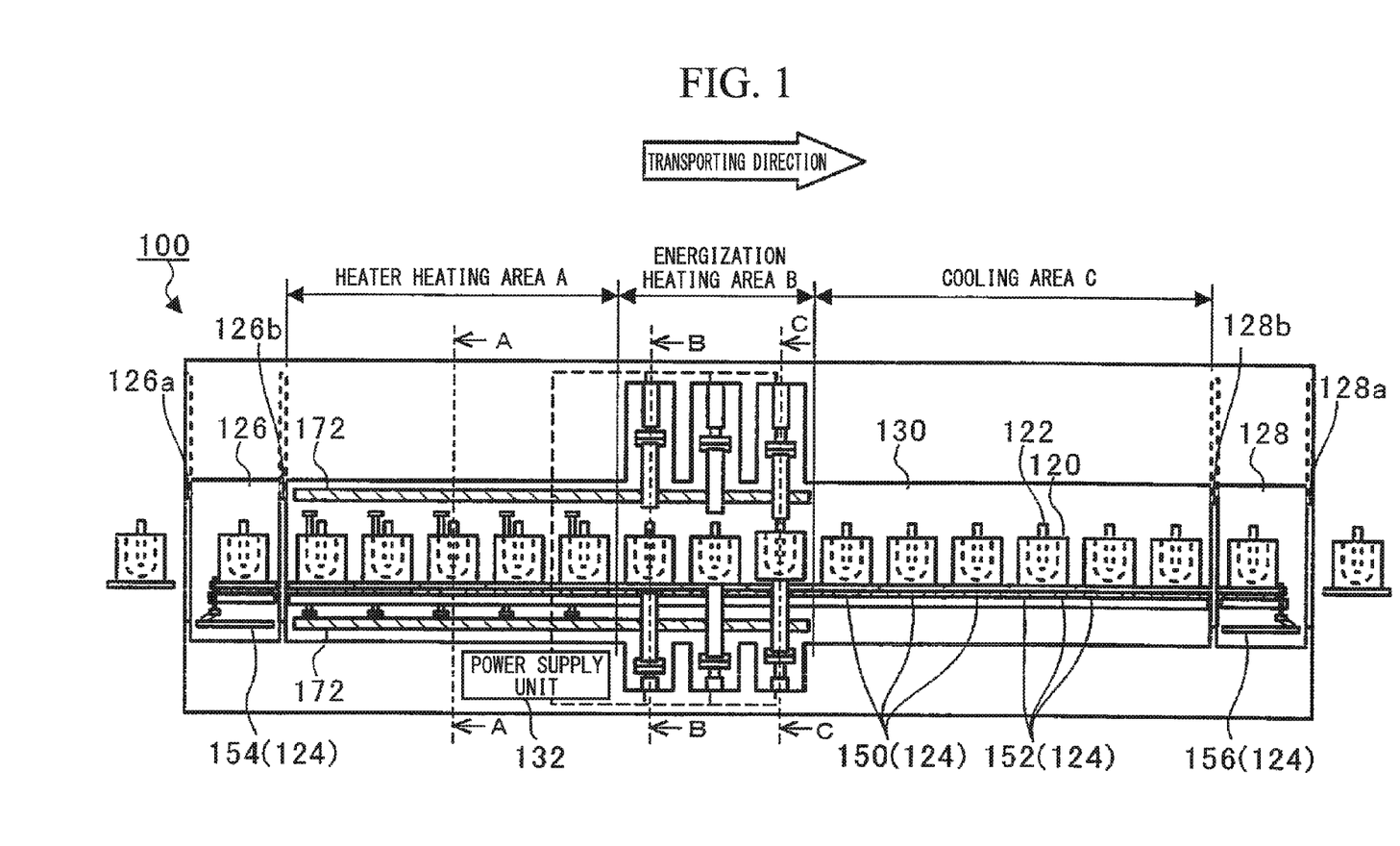
FIG. 1 is an explanatory view illustrating a continuous furnace.

FIG. 1 is an explanatory view illustrating a continuous furnace 100 of a first embodiment. As is shown in FIG. 1, the continuous furnace 100 is provided with crucibles 120, split electrodes 122, a transporting mechanism 124, an inward degassing chamber 126, an outward degassing chamber 128, a continuous processing chamber 130, and a power supply unit 132.

The overall shape of the crucibles 120 is that of a circular cylinder having one closed end, and an outer periphery of a bottom end portion thereof is formed in a truncated cone shape. The crucibles 120 have sufficient heat resistance to enable them to withstand a graphitization temperature T1 (preferably, from 2000 to 3000° C., and more preferably from 2800 to 3000° C.) at which carbon powder is graphitized, and are also conductive. In the present embodiment, the crucibles 120 are provided with a comparatively low electrical resistance of, for example, $2 \times 10^{-4} \sim 4 \times 10^{-4}$ Ω·cm, and are formed from graphite that is capable of withstanding temperatures up to 3200° C. in a non-oxidation atmosphere.

The split electrodes 122 are circular column-shaped electrodes and, in the same way as the crucibles 120, are formed from graphite or the like which has sufficient heat resistance to enable them to withstand the graphitization temperature T1, and are also conductive. The split electrodes 122 are also formed such that they are able to move, and are able to stand upright via the carbon powder inside the crucibles 120. Namely, when a split electrode 122 is standing upright, the bottom end portion of the split electrode 122 is buried inside the carbon power that is contained within the crucible 120. Because of this, the upright state of the split electrode 122 is maintained.

In the present embodiment, a robot arm fixes the split electrodes 122 in a predetermined position, for example, such that only the bottom end portion of each split electrode 122 is positioned within a crucible 120, and such that the split electrode 122 is separated by a predetermined distance from the internal surface of the crucible 120 so that it does not come into contact with the crucible 120. Furthermore, a supply apparatus that supplies the carbon powder pours the carbon powder through an aperture portion of each crucible 120 while avoiding the split electrode 122. In this way, the carbon powder is contained within the crucibles 120 such that the bottom end portion of the split electrode 122 is buried in the carbon powder, and such that a top end portion of the split electrode 122 is exposed from the carbon powder. As a result of this, the upright state of the split electrode 122 is maintained by the carbon powder.

Here, an example of the containment of the carbon powder, which is the subject of the energizing and heating processing, in the crucibles 120 will be given. However, the present invention is not limited to cases such as this. For example, it is also possible to use powders of a variety of conductive heating elements, that generate heat through internal resistance when they are energized, such as graphite, ceramics, or metals or the like. Moreover, instead of powder, it is also possible to use carbon fibers.

FIGS. 2A through 2D are explanatory views illustrating a bottom end portion 122a of a split electrode 122 that is buried within a crucible 120. In FIGS. 2A through 2D and subsequent drawings carbon powder is indicated by cross-hatching. The split electrodes 122 of the present embodiment are formed in a circular column shape that is centered on the vertical axis Z-Z shown in FIG. 2A, and the bottom end portion 122a thereof is formed in a convex semispherical shape. The internal surface of each crucible 120 is formed in a circular cylinder shape, and a bottom end portion 120a thereof is formed in a concave semispherical shape.

Figure 2A:
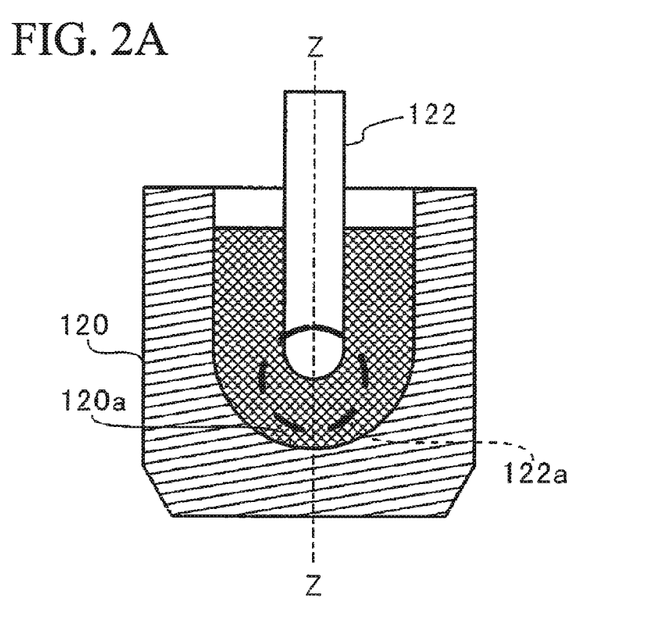
FIG. 2A is an explanatory view illustrating a bottom end portion of a split electrode that is buried inside a crucible.
Figure 2B:
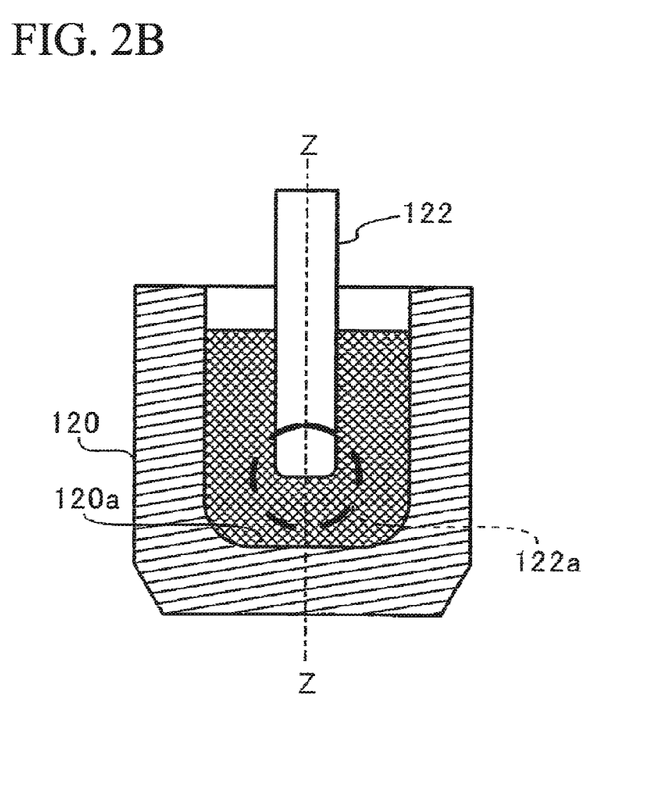
FIG. 2B is an explanatory view illustrating a bottom end portion of a split electrode that is buried inside a crucible.
Figure 2C:
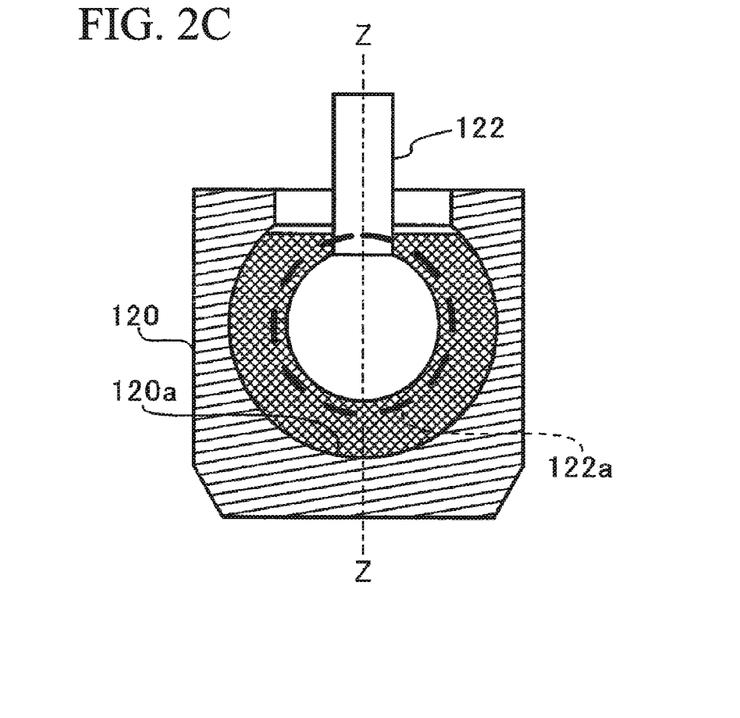
FIG. 2C is an explanatory view illustrating a bottom end portion of a split electrode that is buried inside a crucible.
Figure 2D:
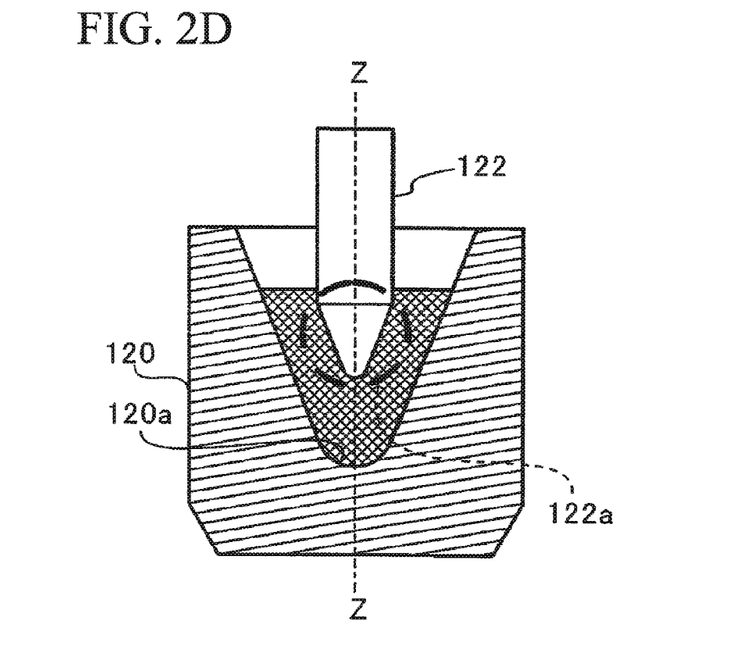
FIG. 2D is an explanatory view illustrating a bottom end portion of a split electrode that is buried inside a crucible.

The shape of the bottom end portion 122a of the split electrodes 122 is not limited to a convex semispherical shape. For example, it may also be formed as a circular column whose bottom end has a chamfered edge (as shown in FIG. 2B), or as a sphere or spheroid that is axially symmetrical around the vertical axis Z-Z and whose diameter is larger than that of the circular column (as shown in FIG. 2C), or as a circular cone or truncated circular cone that is axially symmetrical around the vertical axis Z-Z (as shown in FIG. 2D).

In each of the above cases, the shape of the bottom end portion 122a of the split electrodes 122 matches the shape of the internal surface of the crucibles 120 such that the current distribution within the carbon powder is uniform when voltage is applied thereto (described below). Accordingly, because the distance from the bottom end portion 122a of each electrode 122 to the internal surface of the crucible 120 is substantially uniform, the heat generation distribution when voltage is being applied is also substantially uniform. As a result, the entire carbon powder can be efficiently graphitized.

The transporting mechanism 124 is provided with trays 150, free rollers 152, a pusher apparatus 154, and a puller apparatus 156. This transporting mechanism 124 sequentially transports the crucibles 120, in which the bottom end portions 122a of the split electrodes 122 have been fixed in a buried state in the carbon powder, in the transporting direction (i.e., towards the right-hand side in FIG. 1). Accordingly, the crucibles 120 move within the energization heating area so as to sequentially pass a plurality of energizing mechanisms. The energization heating area and the energizing mechanisms are described below in detail.

The trays 150 are supporting plates that are formed, for example, from graphite or ceramics or the like and that have sufficient heat resistance to enable them to withstand temperatures from 2000 to 2500° C., and the crucibles 120 are mounted on a top portion thereof.

Figure 3:
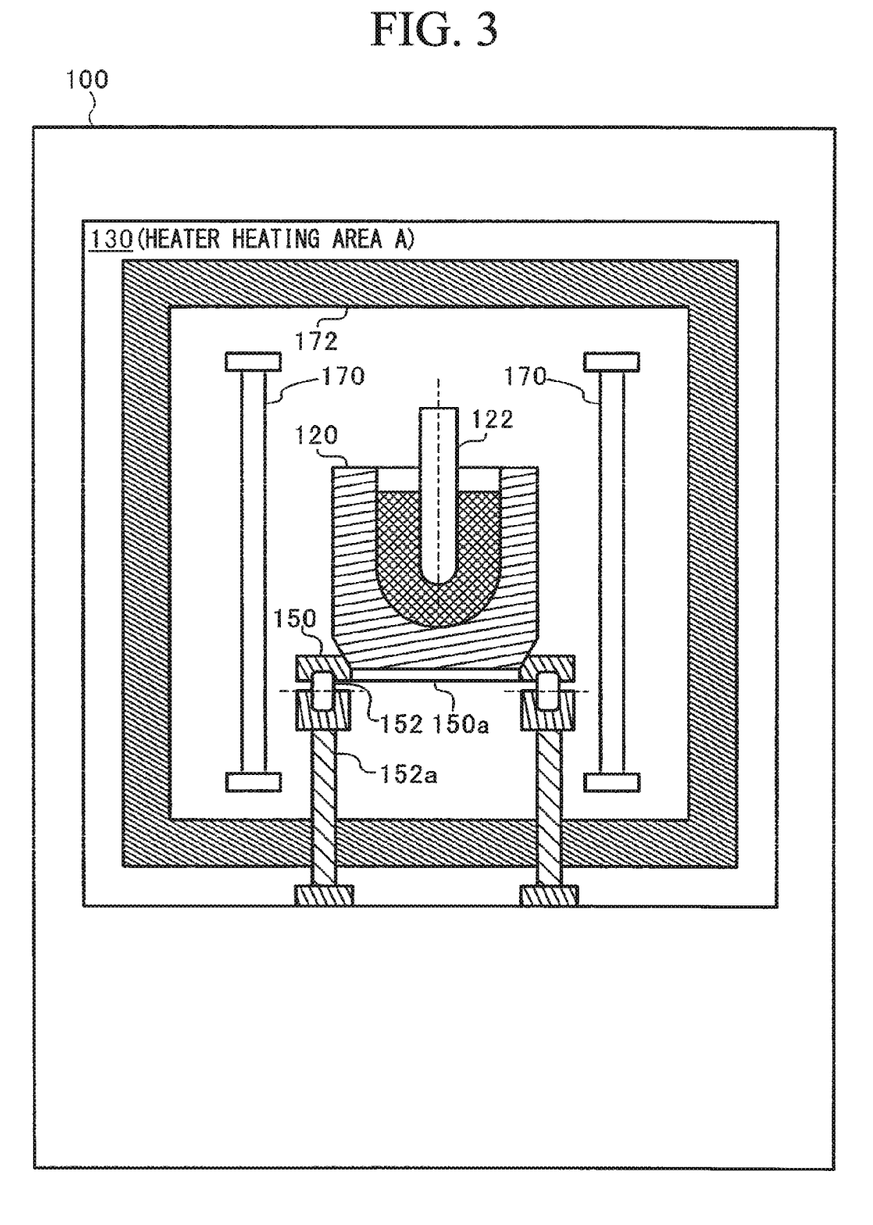
FIG. 3 is a cross-sectional view taken along a line A-A in FIG. 1.

FIG. 3 is a cross-sectional view taken along a line A-A in FIG. 1. As is shown in FIG. 3, the trays 150 are each provided with a through hole 150a. Tapering processing is performed on the inner circumferential surface of each through hole 150a so as to form a sloping surface that slopes downwards as it moves inwards in a radial direction. The sloping surface engages with the sloping portion of the truncated cone shape at the bottom end portion of the crucible 120. Accordingly, it is difficult for the crucibles 120 to slide in a horizontal direction relative to the trays 150, and the horizontal position of the crucibles 120 can be stabilized.

The free rollers 152 are rotating bodies and, as is shown in FIG. 3, are supported such that they are able to rotate on rails provided on top end portions of supporting pillars 152a that stand upright from the floor surface. Moreover, as is shown in FIG. 1, these rails extend in the transporting direction from the inward degassing chamber 126 to the outward degassing chamber 128 via the continuous processing chamber 130 (these are described below). The plurality of free rollers 152 are placed on top of the respective rails so as to form two rows and support the trays 150 such that these can be transported.

The pusher apparatus 154 is provided inside the inward degassing chamber 126. When the trays 150 on which the crucibles 120 have been mounted are placed on top of the free rollers 152 inside the inward degassing chamber 126, the pusher apparatus 154 pushes those trays 150 in the transporting direction so that they are transported to the continuous processing chamber 130. The puller apparatus 156 is provided within the outward degassing chamber 128, and pulls the trays 150 on which the crucibles 120 are mounted from the top of the free rollers 152 inside the continuous processing chamber 130 so that they are transported to the outward degassing chamber 128.

In the present embodiment, the pusher apparatus 154 continuously transports single trays 150 to the continuous processing chamber 130 at regular predetermined times (i.e., takt times). Each time a new tray 150 is transported from the inward degassing chamber 126, the tray 150 that had been previously transported to the inside of the continuous processing chamber 130 is pushed by the newly transported tray 150 and is thereby moved horizontally in the transporting direction. Moreover, the puller apparatus 156 transports the tray 150 that has been pushed out from the continuous processing chamber 130 into the outward degassing chamber 128 at a timing that is synchronized with the pusher apparatus 154.

In this manner, the crucibles 120 that are mounted on the trays 150 are transported intermittently by being moved horizontally inside the continuous furnace 100 at each takt time for a predetermined stroke distance that corresponds to the width of the trays 150.

The inward degassing chamber 126 is provided on the upstream side (i.e., on the left-hand side in FIG. 1) in the transporting direction of the trays 150 in the continuous processing chamber 130, while the outward degassing chamber 128 is provided on the downstream side (i.e., on the right-hand side in FIG. 1) in the transporting direction thereof The inward degassing chamber 126 and the outward degassing chamber 128 are kept in a predetermined atmosphere (for example, in nitrogen gas, argon gas, halogen gas, or in a vacuum) by an atmosphere maintenance and replacement apparatus not shown.

The inward degassing chamber 126 has doors 126a and 126b that are opened or closed by being raised or lowered in a vertical direction. When the doors 126a and 126b are lowered (i.e., closed), the inward degassing chamber 126 becomes an airtight chamber. In the same way, the outward degassing chamber 128 has doors 128a and 128b that are opened or closed by being raised or lowered in a vertical direction. When the doors 128a and 128b are lowered (i.e., closed), the outward degassing chamber 128 becomes an airtight chamber. Namely, when the doors 126a and 126b and the doors 128a and 128b are raised (i.e., opened), the trays 150 can be transported in or transported out.

The continuous processing chamber 130 communicates with both the inward degassing chamber 126 and the outward degassing chamber 128, and becomes an airtight chamber when the doors 126b and 128b are lowered and closed. The same predetermined atmosphere as that in the inward degassing chamber 126 and the outward degassing chamber 128 is maintained in the continuous processing chamber 130 by the atmosphere maintenance and replacement apparatus.

As is shown in FIG. 1, the continuous processing chamber 130 is divided in the following sequence starting from the upstream side into a heater heating area A where heater heating processing is performed, an energization heating area B where energization heating processing is performed, and a cooling area C where cooling processing is performed. Hereinafter, the component elements provided in the heater heating area A, and the component elements provided in the energization heating area B will be described in that sequence.

(Heater Heating Area A)

As is shown in FIG. 3, the continuous heating chamber 130 is provided with a heater 170 and an insulating wall 172 in the continuous processing chamber 130.

The heater 170 is a resistance heater, a gas heater, or a burner or the like, and heats the entire heater heating area A. While the crucibles 120 are being transported through the heater heating area A, the carbon powder inside the crucibles 120 is heated to a preheating temperature T2 (for example, 2000 to 2300° C.). Here, in order to avoid the heater 170 being used to excess, the heating by the heater 170 is performed within a range that does not exceed the preheating temperature T2.

The insulating wall 172 has superior insulation properties and resistance to heat. As is shown in FIG. 1 and FIG. 3, the insulating wall 172 covers the inner circumference of the heater heating area A in the continuous processing chamber 130, and limits the amount of heat that is lost to the outside from the interior of the heater heating chamber A. Moreover, as is shown in FIG. 1, the insulating wall 172 extends so as to also cover the inner circumference of the energization heating area B.

(Energization Heating Area B)

Figure 4:
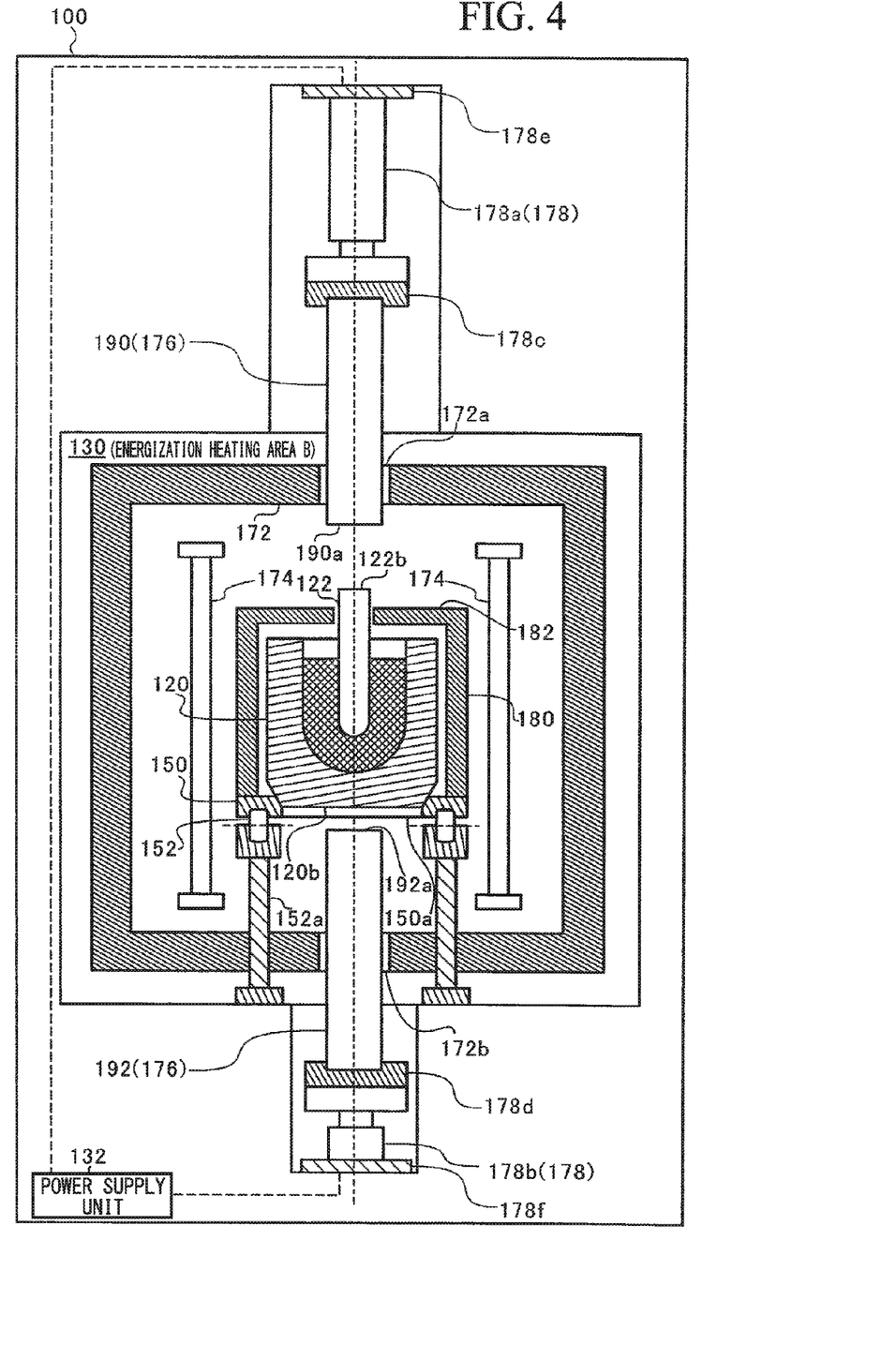
FIG. 4 is a cross-sectional view taken along a line B-B in FIG. 1.
Figure 5:
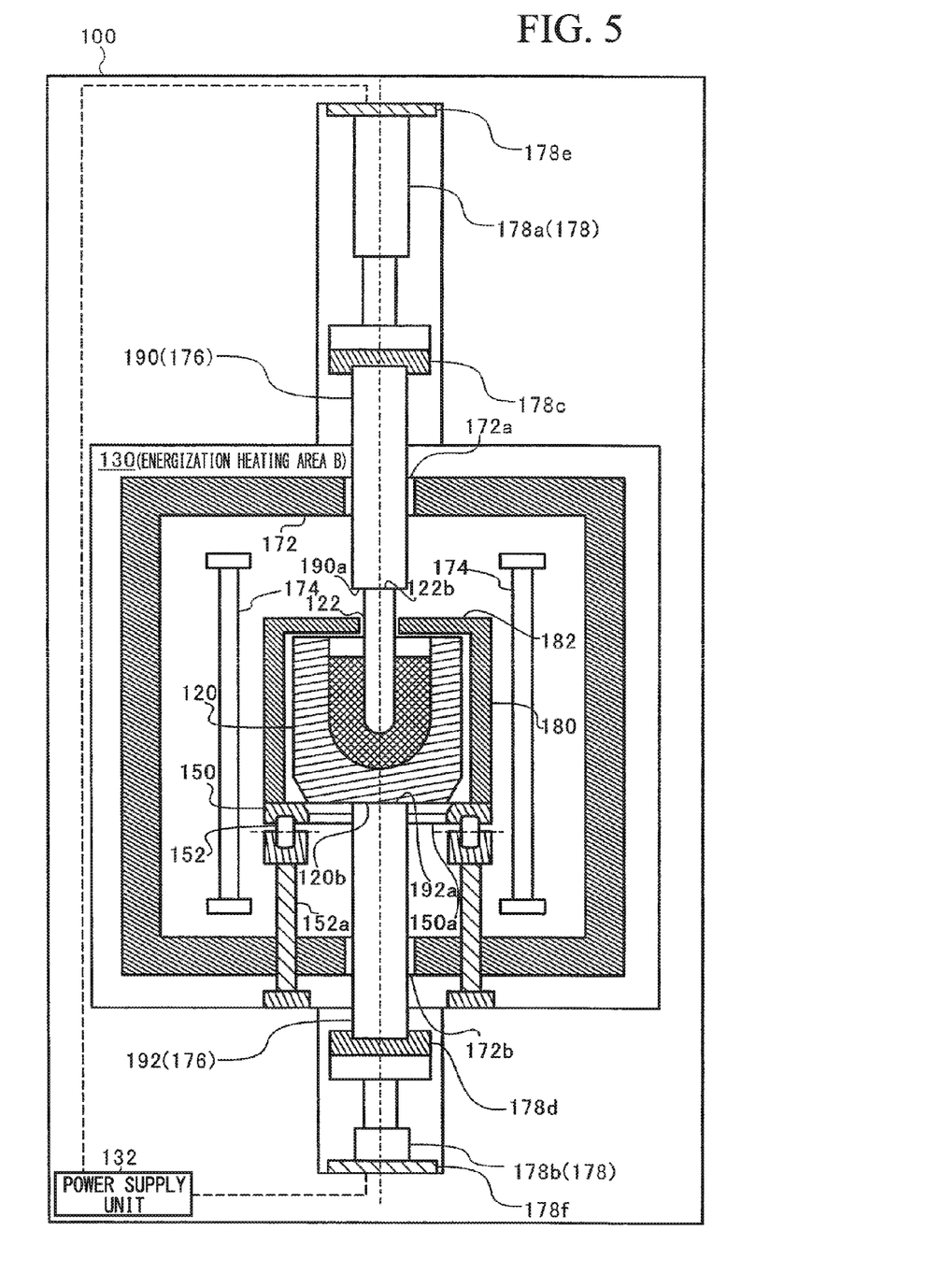
FIG. 5 is a cross-sectional view taken along a line C-C in FIG. 1.

FIG. 4 is a cross-sectional view taken along a line B-B in FIG. 1, while FIG. 5 is a cross-sectional view taken along a line C-C in FIG. 1. Here, in order to facilitate understanding, two typical states are described using FIG. 4 and FIG. 5. FIG. 4 shows a state in which a crucible 120 has been placed in the energization heating area B, while FIG. 5 shows a state in which a raising/lowering apparatus (described below) is operated so as to raise or lower the crucible 120 placed in the energization heating area B.

As is shown in FIG. 4 and FIG. 5, the continuous processing chamber 130 is provided with a heater 174, an energizing mechanism 176, a raising/lowering apparatus 178, side surface insulating material 180, and top surface insulating material 182.

In the same way as the aforementioned heater 170, the heater 174 is a resistance heater, a gas heater, or a burner or the like, and heats the energization heating area B. The carbon powder is maintained at the pre-heating temperature T2 by the heating provided by the heater 174.

The energizing mechanism 176 is formed by combining together an upper electrode 190 and a lower electrode 192 by aligning one on top of the other in a vertical direction. In the energization heating area B, a plurality of energizing mechanisms 176 are arranged in the transporting direction. The energizing mechanisms 176 heat the carbon powder inside the crucibles 120 in sequence at each takt time by means of energization via the upper electrode 190 and the lower electrode 192.

The takt time is determined based, for example, on the quantity of graphite to be produced in each crucible 120, or on the total target quantity of graphite to be produced per unit time, or the like. Here, if it is not possible to heat the carbon powder sufficiently during the energization period of one takt time, then, as in the present embodiment, a plurality (three in the present embodiment) of energizing mechanisms 176 are provided. Namely, by performing energization heating a plurality of times on each individual crucible 120 using the plurality of energizing mechanisms 176, the requisite energization time (i.e., heating time) can be guaranteed.

In the same way as the split electrode 122, the upper electrode 190 is conductive and has sufficient heat resistance to enable it to withstand the graphitization temperature T1. The upper electrode 190 is, for example, a circular column-shaped electrode made from graphite, and is inserted through a through hole 172a that is provided in a top portion (i.e., in the ceiling) of the insulating wall 172. The upper electrode 190 is electrically connected to a power supply unit 132. A gap is formed between the upper electrode 190 and the through hole 172a so that these two are isolated from each other.

Here, when the crucible 120 that is mounted on the tray 150 is transported in the vertical direction of the upper electrode 190, as is shown in FIG. 4, a bottom end portion 190a of the upper electrode 190 and a top end portion 122b of the split electrode 122, which is exposed from the carbon powder contained within the crucible 120, are opposite each other.

In the same way as the split electrode 122, the lower electrode 192 is conductive and has sufficient heat resistance to enable it to withstand the graphitization temperature T1. The lower electrode 192 is, for example, a circular column-shaped electrode made from graphite, and is inserted through a through hole 172b that is provided in a bottom portion (i.e., in the floor) of the insulating wall 172. The lower electrode 192 is electrically connected to a power supply unit 132. A gap is formed between the lower electrode 192 and the through hole 172b so that these two are isolated from each other.

Here, when the crucible 120 that is mounted on the tray 150 is transported in the vertical direction of the lower electrode 192, as is shown in FIG. 4, a top end portion 192a of the lower electrode 192 and a base portion 120b of the crucible 120 are opposite each other.

The raising/lowering apparatus 178 is provided with a cylinder 178a that raises or lowers the upper electrode 190, a cylinder 178b that raises or lowers the lower electrode 192, and a hydraulic pump (not shown) that raises or lowers the cylinders 178a and 178b.

The cylinder 178a supports the upper electrode 190 via a water-cooled electrode plate 178c so that it faces vertically downwards, and raises or lowers the upper electrode 190 using a hydraulic pump (not shown). As a result, the upper electrode 190 is able to be raised and lowered between a standby position (the position shown in FIG. 4) and a contact position (the position shown in FIG. 5) where the bottom end portion 190a of the upper electrode 190 is in contact with the top end portion 122b of the split electrode 122.

The cylinder 178b supports the lower electrode 192 via a water-cooled electrode plate 178d so that it faces vertically upwards, and raises or lowers the lower electrode 192 using a hydraulic pump (not shown). As a result, the lower electrode 192 is able to be raised and lowered between a standby position (the position shown in FIG. 4) and a contact position (the position shown in FIG. 5) where the top end portion 192a of the lower electrode 192 comes into contact with the base portion 120b of the crucible 120 so as to lift the crucible 120 up from the tray 150 and thereby mutually isolate the crucible 120 and the tray 150 from each other.

In addition, isolating components 178e and 178f are interposed respectively between the cylinders 178a and 178b and the continuous processing chamber 130. The isolating components 178e and 178f electrically isolate the upper electrode 190 and the lower electrode 192 from the continuous processing chamber 130.

The side surface insulating material 180 extends in parallel with the direction in which the crucibles 120 are transported by the transporting mechanism 124, and so as to also face a side surface of the crucibles 120 as these are being transported so that it does not obstruct the transporting of the crucibles 120. The side surface insulating material 180 suppresses the heat release from the crucible 120, and particularly the heat release in an orthogonal direction relative to the transporting direction.

The top surface insulating material 182 extends in parallel with the direction in which the crucibles 120 are transported by the transporting mechanism 124, and so as to also face a top surface of the crucibles 120 as these are being transported so that it does not obstruct the transporting of the crucibles 120. The top surface insulating material 182 suppresses the heat release from the crucible 120, and particularly the heat release from the crucible 120 in a vertically upward direction.

Because the heat release from the crucible 120 is suppressed in this way by the side surface insulating material 180 and the top surface insulating material 182, the continuous furnace 100 of the present embodiment is able to efficiently heat carbon powder. In the present embodiment, the side surface insulating material 180 and the top surface insulating material 182 are formed integrally with each other and present an L-shaped cross-section. Note that the side surface insulating material 180 and the top surface insulating material 182 may also be formed independently of each other.

The power supply unit 132 is placed, for example, in a position where the temperature is lower than inside the furnace, and applies voltage between the upper electrode 190 and the lower electrode 192 via a cable (not shown) when a crucible 120 is positioned in a position where it can be energized by the respective plurality of energizing mechanisms 176. Specifically, as is shown in FIG. 5, the power supply unit 132 applies a voltage when the bottom end portion 190a of the upper electrode 190 has been placed in contact with the top end portion 122b of the split electrode 122 by the driving of the raising/lowering apparatus 178, and the top end portion 192a of the lower electrode 192 has also been placed in contact with the base portion 120b of the crucible 120 by the driving of the raising/lowering apparatus 178. In this manner, a high electric potential difference is generated between the split electrode 122, which is connected to the upper electrode 190, and the crucible 120, which is connected to the lower electrode 192, so that the carbon powder inside the crucible 120 can be heated by being energized.

Figure 6A:
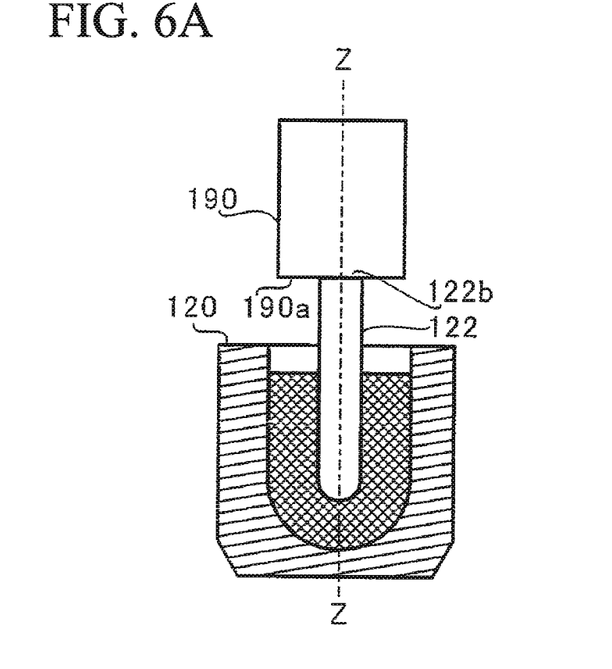
FIG. 6A is an explanatory view illustrating the shapes of a top end portion of the split electrode and a bottom end portion of an upper electrode.
Figure 6B:
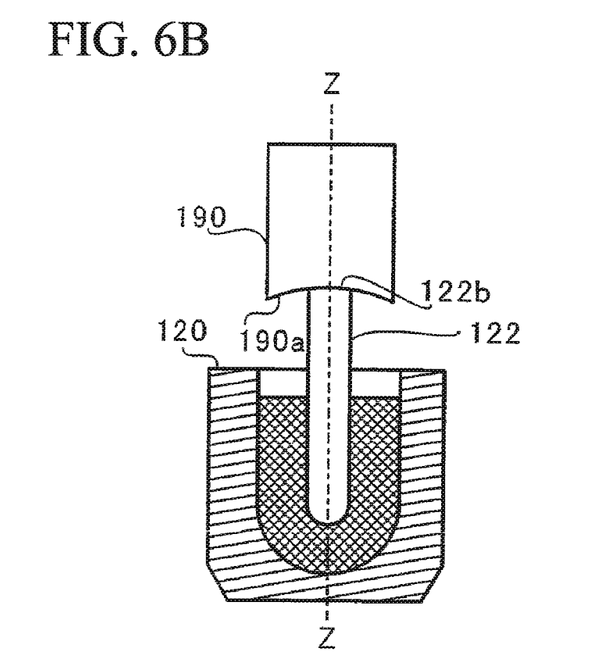
FIG. 6B is an explanatory view illustrating the shapes of a top end portion of the split electrode and a bottom end portion of an upper electrode.

FIGS. 6A and 6B are explanatory views showing the shape of the top end portion 122b of the split electrode 122 and the shape of the bottom end portion 190a of the upper electrode 190. The shape of the bottom end portion 190a of the upper electrode 190 and the shape of the top end portion 122b of the split electrode 122 shown in FIG. 6A are both formed as flat surfaces. Because of this, the bottom end portion 190a of the upper electrode 190 and the top end portion 122b of the split electrode 122 are in surface contact with each other. However, in the present embodiment, the surface area of the surface of the bottom end portion 190a of the upper electrode 190, and the surface area of the surface of the top end portion 122b of the split electrode 122 are mutually different.

By varying the surface areas of the contact surfaces in this manner, even if the central axis of the upper electrode 190 and the central axis of the split electrode 122 go out of alignment with each other in a horizontal direction, the contact surface area can be secured within the range of the surface having the larger surface area in the same way as before the central axes became mutually misaligned. Because of this, the carbon powder can be heated stably.

In the present embodiment, as is shown in FIG. 6A, the surface area of the surface of the bottom end portion 190a of the upper electrode 190 is larger than the surface area of the surface of the top end portion 122b of the split electrode 122.

In this manner, the surface area of the surface of the bottom end portion 190a of the upper electrode 190 is increased in order to guarantee stability against any shifting in the central axes of the upper electrode 190 and the split electrode 122. By employing this type of structure, it is possible to freely set the surface area of the top end portion 122b of the split electrode 122 within the range of the surface area of the surface of the bottom end portion 190a of the upper electrode 190. As a result, a suitable size can be selected in accordance with the quantity of energization.

Furthermore, as is shown in FIG. 6B, the surface of the bottom end portion 190a of the upper electrode 190 and the surface of the top end portion 122b of the split electrode 122 may also be formed as a pair of spherical surfaces, with one spherical surface being concave (i.e., a concave spherical surface) and the other spherical surface being convex (i.e., a convex spherical surface), and with both spherical surfaces having the same radius.

By employing this type of structure, even if the central axis of the split electrode 122 becomes tilted, the surface contact between the surface of the bottom end portion 190a of the upper electrode 190 and the surface of the top end portion 122b of the split electrode 122 is still maintained. Because of this, in the continuous furnace 100 it is possible to maintain essentially the same contact surface area both before and after the tilting of the central axis, and it is possible to stably heat the carbon powder.

Moreover, as is shown in FIG. 6B, if the surface of the bottom end portion 190a of the upper electrode 190 is formed as a concave spherical surface and the surface of the top end portion 122b of the split electrode 122 is formed as a convex spherical surface, then even if lumps and the like of carbon powder become adhered to the surface of the top end portion 122b of the split electrode 122, there is an increased possibility that the spherical surface of one of the upper electrode 190 and the split electrode 122 will slide over the spherical surface over the other so that any such lumps and the like will fall off. Because of this, it is possible to prevent the contact surface area between the two spherical surfaces from being reduced because of lumps and the like of carbon powder becoming jammed between the surface of the bottom end portion 190a of the upper electrode 190 and the top end surface 122b of the split electrode 122.

(Graphite Production Method)

Next, a method of producing graphite using the continuous furnace 100 will be described. As is described above, in the continuous furnace 100, a plurality of crucibles 120 are transported in sequence for a predetermined stroke distance at each takt time, and graphitization processing is performed in sequence on each individual crucible 120. Here, in order to make the routine easier to understand, the flow of processing is described for a single crucible 120.

Figure 7:
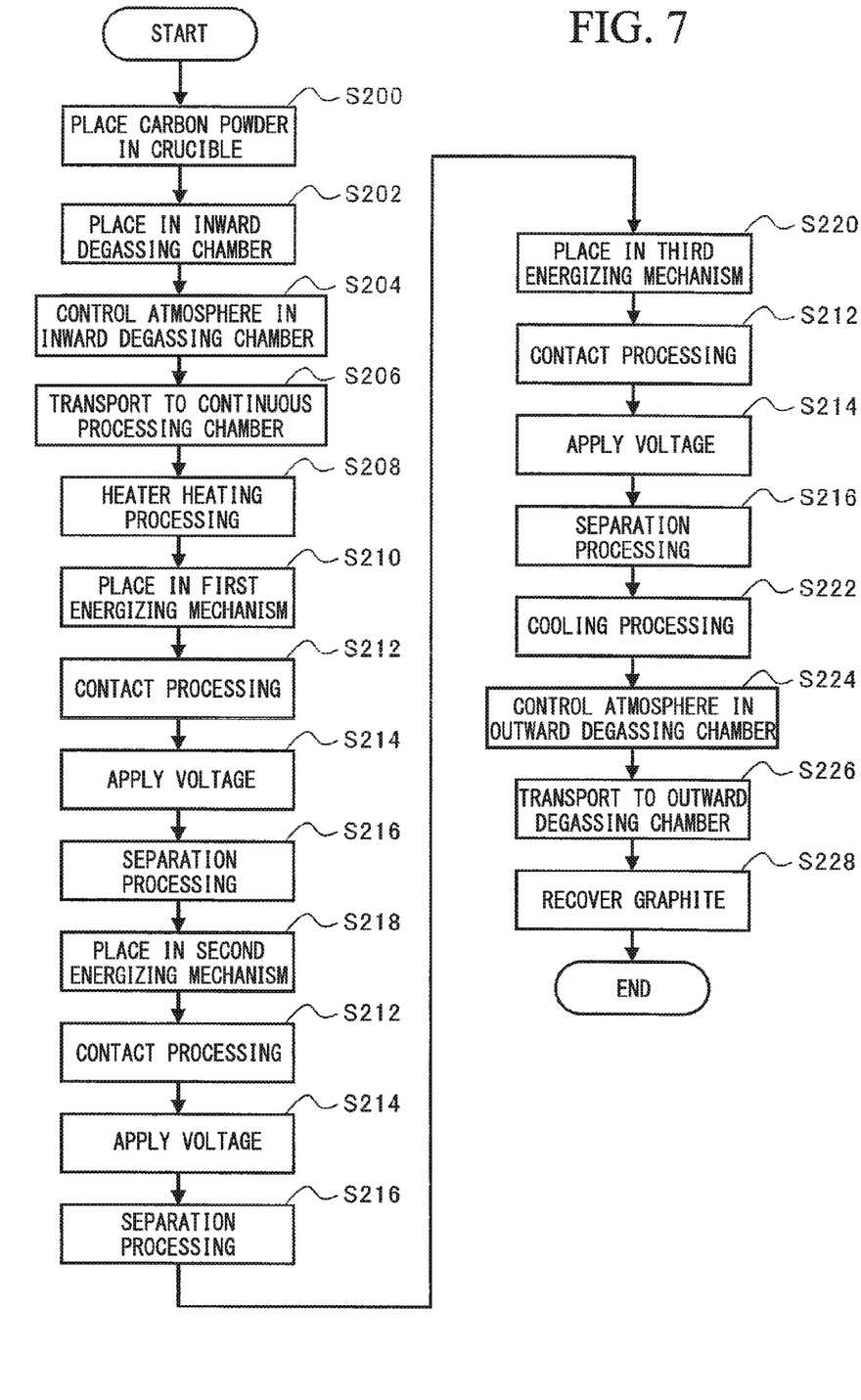
FIG. 7 is a flowchart illustrating the processing flow of a graphite producing method that uses a continuous furnace.

FIG. 7 is a flowchart illustrating the processing flow of a method of producing graphite that uses the continuous furnace 100. As is shown in FIG. 7, firstly, a robot arm fixes the split electrode 122 in a predetermined position such that only the bottom end portion of the split electrode 122 is located within the crucible 120, and such that it is separated by a predetermined distance from the internal surface of the crucible 120 so that it does not come into contact with the crucible 120, and a supply apparatus supplies carbon powder in the crucible 120 (S200). At this time, because the upright position of the split electrode 122 is maintained by the supplied carbon powder, it does not need to be held by the robot arm. The robot arm fixes the split electrode 122 in a predetermined position.

Next, the door 126a is opened and the tray 150 on which the crucible 120 has been mounted is placed on top of the free rollers 152 inside the inward degassing chamber 126 (S202).

When the door 126a is then closed, the atmosphere maintenance and replacement apparatus introduces and expels gas such that a predetermined atmosphere is created inside the inward degassing chamber 126 (S204). Next, the door 126b is opened and the pusher apparatus 154 pushes the tray 150 forwards so that it is transported into the continuous chamber 130 (S206). After this transporting, the door 126b is closed.

Figure 8:
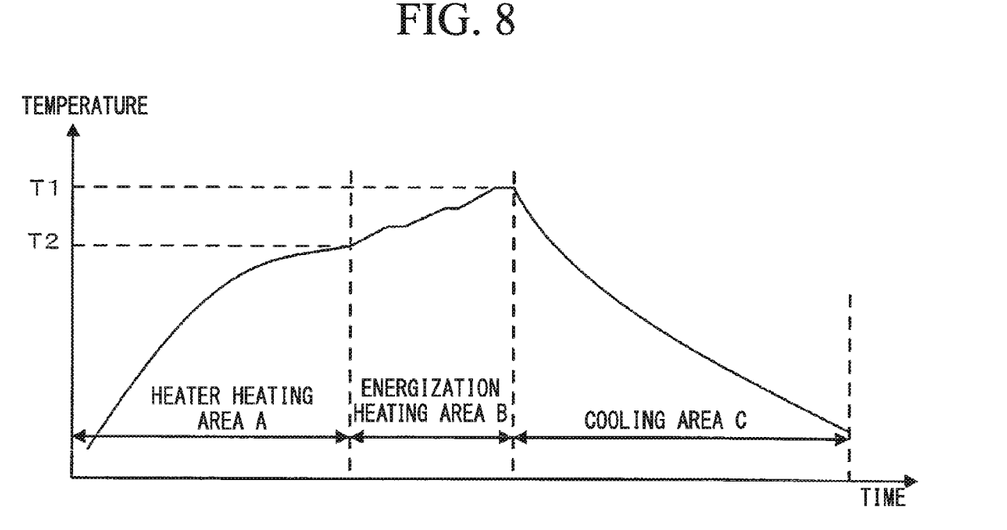
FIG. 8 is an explanatory view illustrating temperature changes in carbon powder.

FIG. 8 is an explanatory view illustrating changes in the temperature of the carbon powder and graphite inside the crucible 120. In FIG. 8, the horizontal axis shows time, while the vertical axis shows the temperature of the carbon powder and graphite inside the crucible 120.

As is shown in FIG. 8, in the heater heating area A of the continuous processing chamber 130, the heater 170 heats the carbon powder inside the crucible 120 that has been mounted on the newly arrived tray 150 to the preheating temperature T2 (S208).

Next, the tray 150 is transported to the energization heating area B, and the crucible 120 is positioned on a first energizing mechanism 176 (S210). At this time, if the crucible 120 that has been mounted on the tray 150 is positioned vertically underneath the upper electrode 190, then the bottom end portion 190a of the upper electrode 190 and the top end portion 122b of the split electrode 122 that is exposed from the carbon powder contained in the crucible 120 are mutually facing each other. Moreover, if the crucible 120 that has been mounted on the tray 150 is positioned vertically above the lower electrode 192, then the top end portion 192a of the lower electrode 192 and the base portion 120b of the crucible 120 are mutually facing each other.

The raising/lowering apparatus 178 lowers the cylinder 178a so that the bottom end portion 190a of the upper electrode 190 is brought into contact with the top end portion 122b of the split electrode 122. In addition to this, the raising/lowering apparatus 178 also raises the cylinder 178b so that the top end portion 192a of the lower electrode 192 is brought into contact with the base portion 120b of the crucible 120. Furthermore, the raising/lowering apparatus 178 also lifts the crucible 120 off the tray 150 via the cylinder 178b (S212).

The power supply unit 132 applies voltage between the upper electrode 190 and the lower electrode 192 (S214). When a predetermined voltage application time has elapsed, the raising/lowering apparatus 178 raises the cylinder 178a and lowers the cylinder 178b, and returns the crucible 120 to the top of the tray 150 (S216). The raising/lowering apparatus 178 then returns the upper electrode 190 and the lower electrode 192 to their respective standby positions.

Next, the tray 150 is transported to the second energizing mechanism 176 (S218) and, in the same way as for the first energizing mechanism, the contact processing step S212, the voltage application processing step S214, and the crucible mounting step S216 are executed. The tray 150 is then transported to the third energizing mechanism 176 (S220) and, in the same way as for the first energizing mechanism, the contact processing step S212, the voltage application processing step S214, and the crucible mounting step S216 are executed.

In this manner, by performing energization heating in sequence using the three energizing mechanisms 176, as is shown in FIG. 8, the carbon powder reaches the graphitization temperature T1. In this manner, the carbon powder is graphitized, and graphite is produced.

Thereafter, the tray 150 is transported to the cooling area C where the carbon powder inside the crucible 120 is cooled (S222). The atmosphere maintenance and replacement apparatus then introduces and expels gas such that a predetermined atmosphere is created inside the outward degassing chamber 128 (S224). Next, the door 128b is opened and the puller apparatus 156 then pulls the tray 150, that is located on top of the free rollers 152 and on which the crucible 120 has been mounted, out from the continuous chamber 130, and transports it to the outward degassing chamber 128 (S226).

Thereafter, the door 128b is closed and the door 128a is then opened. The crucible 120 together with the tray 150 are then transported out from the outward degassing chamber 128, and the graphite inside the crucible 120 is recovered (S228). After this transporting, the door 128a is closed.

In this manner, according to the method for producing graphite according to the present embodiment, it is possible to efficiently graphitize carbon powder.

As has been described above, in the continuous furnace 100 of the present embodiment, even when a plurality of energizing mechanisms 176 are used to energize carbon powder, a state in which the bottom end portion 122a of the split electrode 122 remains buried in the carbon powder is maintained, and the split electrode 122 does not need to be extracted from and then reinserted back into the carbon powder each time it is moved between energizing mechanisms 176. Because of this, it is not necessary for the transporting mechanism 124 to rigorously control the horizontal position of the split electrode 122 relative to the crucible 120, and a low-cost apparatus can be achieved.

Moreover, by employing heater heating processing in combination with energization heating processing in the continuous furnace 100, the processing time can be shortened compared with when energization heating processing alone is used. Because of this, the furnace length can be shortened, and both the initial costs and running costs can be suppressed.

Unlike a conventional continuous furnace into which carbon powder is continuously introduced and graphite recovered, the continuous furnace 100 of the present embodiment requires no mechanism for continuously discharging graphite. Because of this, bridges created from carbon powder do not occur and stable graphite production is possible.

(Second Embodiment)

In the above-described first embodiment, the continuous furnace 100 that performs processing continuously on a plurality of crucibles 120 is described as an example of a graphite furnace. In the second embodiment, a batch furnace 300 is described as an example of a graphite furnace.

(Batch Furnace 300)

Figure 9:
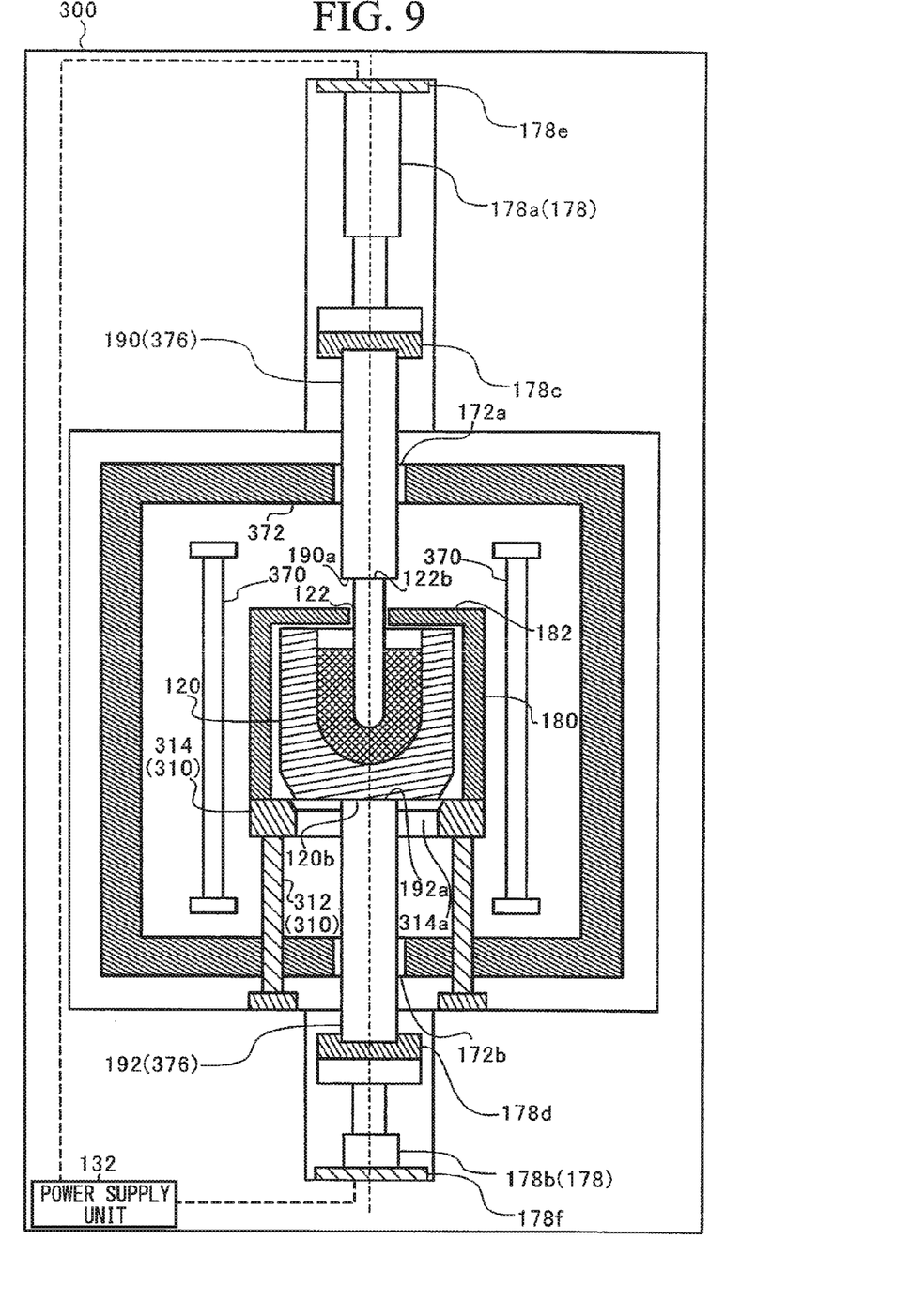
FIG. 9 is an explanatory view illustrating a batch furnace.

FIG. 9 is an explanatory view illustrating a batch furnace 300. The batch furnace 300 is provided with a crucible 120, a split electrode 122, a supporting portion 310, a power supply unit 132, a heater 370, an insulating wall 372, an energizing mechanism 376, and a raising/lowering mechanism 178. The energizing mechanism 376 is formed by combining together an upper electrode 190 and a lower electrode 192.

Note that because the functions of the crucible 120, the split electrode 122, the power supply unit 132, the raising/lowering apparatus 178, the upper electrode 190, and the lower electrode 192, which have already been described as component elements of the continuous furnace 100 of the first embodiment, are essentially the same, any duplicate description thereof is omitted. Here, the description centers mainly on the supporting unit 310, the heater 370, the insulating wall 372, and the energizing mechanism 376 whose structures differ from those of the first embodiment.

The supporting portion 310 is formed by supporting pillars 312 and a pedestal 314. The supporting pillars 312 stand upright from a floor surface and the pedestal is fixed to a top end portion thereof In the same way as the trays 150, the pedestal 314 is, for example, a supporting plate formed from graphite or from ceramics, and a crucible 120 is mounted on a top portion thereof. This pedestal 314 is provided with a through hole 314a, and a portion of an inner circumferential surface of this through hole 314a has undergone tapering processing so that the same type of sloping surface as in the first embodiment is formed. The sloping surface that is formed on the inner circumferential surface of this through hole 314a engages with a truncated cone shaped sloping surface that is formed at the bottom end portion of the crucible 120.

Moreover, in the same way as in the first embodiment, when the top end portion 192a of the lower electrode 192 comes into contact with the base portion 120b of the crucible 120 so as to lift the crucible 120 up from the pedestal 314 into the position shown in FIG. 9, the crucible 120 and the pedestal 314 are insulated from each other.

The heater 370 is a resistance heating heater, a gas heater, or a burner or the like. The heater 370 heats the carbon powder inside the crucible 120 to the preheating temperature T2, and then maintains it at the preheating temperature T2. The insulating wall 372 has superior insulation properties and resistance to heat, and covers the inner circumference of the batch furnace 300 so as to limit the amount of heat that is released to the outside from the interior of the batch furnace 300. Unlike the continuous furnace 100, there is only one energizing mechanism 376 instead of a plurality of energizing mechanisms, and this provides energization heating to the carbon powder inside the crucible 120.

The batch furnace 300 of the present embodiment performs batch processing from the receipt of the carbon powder through to the graphitization thereof with the crucible 120 being fixed in a horizontal position instead of being transported while the heater heating processing, the energization heating processing, and the cooling processing are being performed.

In the batch furnace 300 of the present embodiment as well, in the same way as in the continuous furnace 100, when the carbon powder is being produced in the crucible 120, a robot arm fixes the split electrode 122 in a predetermined position such that, for example, only the bottom end portion of the split electrode 122 is positioned within the crucible 120, and such that the split electrode 122 is separated by a predetermined distance from the internal surface of the crucible 120 so that it does not come into contact with the crucible 120. Furthermore, a supply apparatus that supplies the carbon powder pours the carbon powder from an aperture portion of the crucible 120 while avoiding the split electrode 122.

In this manner, because the batch furnace 300 is provided with the split electrode 122 that is buried in the carbon powder, the batch furnace 300 is able to uniformize the density distribution of the carbon powder, and uniformize the flowing current when the batch furnace 300 is performing the energization heating.

Moreover, if it becomes necessary to change the size of the crucible 120, it is necessary to replace the split electrode 122 as well in order to optimize the thickness of the carbon powder layer that is sandwiched between the crucible 120 and the split electrode 122. At this time, in the batch furnace 300, because the split electrode 122 is capable of moving freely, this replacement operation is simple to perform. Namely, the size can be changed quickly without it being necessary to remove and replace the upper electrode 190 and the lower electrode 192.

As has been described above, in both the continuous furnace 100 of the first embodiment and the batch furnace 300 of the second embodiment, because current flows reliably to carbon powder, it is possible to efficiently graphitize the carbon powder. Moreover, the split electrode 122 is not removed from the carbon powder from the point when the carbon powder is first received in the crucible 120 until the point when the energization has ended. As result of this, these graphitization furnaces (i.e., the continuous furnace 100 and the batch furnace 300) are able to maintain a state of close contact between the carbon powder and the split electrode 122 without any gaps being generated between the two. Therefore, these graphitization furnaces are able to uniformly energize the entire quantity of carbon powder.

Moreover, in the continuous furnace 100 and batch furnace 300 of the above-described embodiments, the resistance values of the carbon powder on a tangent line at an arbitrary point on the surface of the bottom end portion 122a of the split electrode 122 as far as the crucible 120 are substantially equal at any point on the surface of the bottom end portion 122a. Because of this, compared to the conventional technology, the current flowing through the carbon powder is uniformized, and graphitization can be performed efficiently.

Moreover, in the present embodiment, the position in a vertical direction of the split electrode 122, which is fixed by means of a robot arm or the like, is adjusted prior to the carbon powder being placed in the crucible 120 in accordance with the type of carbon powder and with the bulk density of the carbon powder that is being placed within the crucible 120. By doing this, the current distribution can be uniformized even further.

Furthermore, the energizing mechanism 176 is warmed to the preheating temperature T2 by the heaters 174 and 370. Because of this, when the bottom end portion 190a of the upper electrode 190 is being brought into contact with the top end portion 122b of the split electrode 122, and also when the top end portion 192a of the lower electrode 192 is being brought into contact with the base portion 120b of the crucible 120, it is possible to prevent any heat being captured from the split electrode 122 or the crucible 120.

Hereinabove, while an exemplary embodiment of the present invention has been described with reference to the accompanying drawings, the present invention is not limited to such an embodiment. It will be apparent to those skilled in the art that various modifications or variations may be made without departing from the scope of the present invention described in the description, and will also fall into the technical scope of the present invention.

Note that it is not essential for the respective steps of the method for producing graphite of the present specification to be performed via time series processing in accordance with the sequence illustrated in the flowchart, and it is also possible for these steps to include parallel or subroutine processing.

INDUSTRIAL APPLICABILITY

The present invention can be used for a graphitization furnace that graphitizes carbon powder by heating it, and for a method of producing graphite.

DESCRIPTION OF THE REFERENCE NUMERALS

100 . . . Continuous furnace
120 . . . Crucible
120b . . . Crucible base portion
122 . . . Split electrode
122a . . . Bottom end portion of split electrode
122b . . . Top end portion of split electrode 124 ... Transporting mechanism
132 ... Power supply unit
176 ... Energizing mechanism
180 ... Side surface insulating material
182 ... Top surface insulating material
190 ... Upper electrode
190a ... Bottom end portion of upper electrode
192 ... Lower electrode
192a ... Top end portion of lower electrode
300 ... Batch furnace

What is claimed is:

1. A graphitization furnace comprising:
   split electrodes that are conductive and are provided so as to be freely movable;
   crucibles that are conductive and that contain carbon powder, with a bottom end portion of each split electrode being buried in the carbon powder and with a top end portion of the split electrodes protruding from the carbon powder;
   upper electrodes that are positioned such that a bottom end portion thereof faces the top end portion of a split electrode;
   lower electrodes that are positioned such that a top end portion thereof faces a base portion of a crucible; and
   a power supply unit that, when the bottom end portion of an upper electrode is placed in contact with the top end portion of a split electrode and the top end portion of a lower electrode is placed in contact with the base portion of a crucible, applies a voltage between the upper electrode and the lower electrode.

2. The graphitization furnace according to claim 1, wherein the bottom end portion of an upper electrode and the top end portion of a split electrode are in surface contact with each other, and surface areas of the surfaces that are in contact with each other are mutually different.

3. The graphitization furnace according to claim 2, wherein the surface area of the surface of the bottom end portion of an upper electrode is larger than the surface area of the surface of the top end portion of a split electrode.

4. The graphitization furnace according to claim 1, wherein the surface of the bottom end portion of an upper electrode and the surface of the top end portion of a split electrode are formed as a pair of spherical surfaces having the same radius, with one spherical surface being a concave spherical surface and the other spherical surface being a convex spherical surface.

5. The graphitization furnace according to claim 1, wherein there are further provided:
   an energization heating area where there are provided a plurality of energizing mechanisms that are formed by combining together an upper electrode and a lower electrode; and
   a transporting mechanism that sequentially transports the crucibles between the plurality of energizing mechanisms within the energization heating area, and wherein the power supply unit applies the voltage when the crucibles are positioned at each one of the plurality of energizing mechanisms.

6. The graphitization furnace according to claim 5, wherein side surface insulating material that limits any heat release from side surfaces of the crucibles is further provided at positions that are parallel to the direction in which the crucibles are transported by the transporting mechanism.

7. The graphitization furnace according to claim 6, wherein top surface insulating material that limits any heat release from a top surface of the crucibles is further provided at a position that is parallel to the direction in which the crucibles are transported by the transporting mechanism.

8. The graphitization furnace according to claim 1, wherein the graphitization furnace is a batch furnace that performs batch processing from the receipt of the carbon powder through to the graphitization thereof with the horizontal position of the crucibles being fixed in place.

9. A method for producing graphite comprising:
   a step in which carbon powder is placed in a crucible with a bottom end portion of a split electrode being buried in the carbon powder, and with a top end portion of the split electrode protruding from the carbon powder;
   a step in which a bottom end portion of an upper electrode is brought into contact with the top end portion of the split electrode, and a top end portion of a lower electrode is brought into contact with a base portion of the crucible; and
   a step in which voltage is applied between the upper electrode and the lower electrode so as to graphitize the carbon powder and thereby produce graphite.

* * * * *